(12) United States Patent
Candillier et al.

(10) Patent No.: US 11,211,173 B2
(45) Date of Patent: Dec. 28, 2021

(54) NUCLEAR REACTOR INTEGRATING A SAFETY PRIMARY HEAT EXCHANGER

(71) Applicant: SOCIETE TECHNIQUE POUR L'ENERGIE ATOMIQUE, Villiers le Bacle (FR)

(72) Inventors: Laurent Candillier, Simiane (FR); Frédéric Costantini, Fuveau (FR); Michel Felziere, Bouc Bel Air (FR); Lorrain Demas, Cabries (FR)

(73) Assignee: SOCIETE TECHNIQUE POUR L'ENERGIE ATOMIQUE, Villiers le Bacle (FR)

( * ) Notice: Subject to any disclaimer, the term of this patent is extended or adjusted under 35 U.S.C. 154(b) by 144 days.

(21) Appl. No.: 16/480,793

(22) PCT Filed: Jan. 25, 2018

(86) PCT No.: PCT/EP2018/051875
§ 371 (c)(1),
(2) Date: Jul. 25, 2019

(87) PCT Pub. No.: WO2018/138217
PCT Pub. Date: Aug. 2, 2018

(65) Prior Publication Data
US 2019/0385754 A1 Dec. 19, 2019

(30) Foreign Application Priority Data

Jan. 26, 2017 (FR) ........................................ 1750649

(51) Int. Cl.
*G21C 1/32* (2006.01)
*G21C 15/18* (2006.01)
*F28D 21/00* (2006.01)

(52) U.S. Cl.
CPC ............... *G21C 1/32* (2013.01); *G21C 15/18* (2013.01); *F28D 2021/0054* (2013.01)

(58) Field of Classification Search
CPC ... G21C 1/32; G21C 15/18; F28D 2021/0054; Y02E 30/30
See application file for complete search history.

(56) References Cited

U.S. PATENT DOCUMENTS

| 4,508,677 A | * | 4/1985 | Craig | G21C 1/322 |
| | | | | 376/174 |
| 5,021,211 A | * | 6/1991 | Hunsbedt | G21C 15/18 |
| | | | | 376/299 |

(Continued)

OTHER PUBLICATIONS

International Search Report as issued in International Patent Application No. PCT/EP2018/051875, dated Jul. 10, 2018.

*Primary Examiner* — Darlene M Ritchie
(74) *Attorney, Agent, or Firm* — Pillsbury Winthrop Shaw Pittman LLP

(57) ABSTRACT

A nuclear reactor includes a vessel incorporating at least one primary power heat exchanger for cooling the primary liquid of the nuclear reactor during the normal operation of the reactor and at least one primary passive safety heat exchanger for cooling the primary liquid of the nuclear reactor in the event of a malfunction in the normal cooling of the primary liquid of the reactor. The vessel includes a compartment arranged in the thickness thereof, wherein the primary passive safety heat exchanger is at least partially contained inside the compartment.

9 Claims, 4 Drawing Sheets

(56) References Cited

U.S. PATENT DOCUMENTS

| | | | | |
|---|---|---|---|---|
| 5,043,136 | A | * | 8/1991 | Hunsbedt ............... G21C 15/18 376/299 |
| 5,694,442 | A | * | 12/1997 | Cinotti ................... G21C 9/012 376/298 |
| 9,390,820 | B2 | * | 7/2016 | Haratyk .................. G21C 15/18 |
| 9,905,319 | B2 | * | 2/2018 | Castanie ................ G21C 1/322 |
| 2005/0135544 | A1 | * | 6/2005 | Eoh .......................... G21C 1/03 376/290 |
| 2010/0316181 | A1 | * | 12/2010 | Thome .................... F22B 21/26 376/372 |
| 2013/0336440 | A1 | | 12/2013 | Memmott et al. |
| 2013/0336441 | A1 | | 12/2013 | Cronje et al. |
| 2015/0146838 | A1 | | 5/2015 | Fribourg |
| 2015/0168350 | A1 | * | 6/2015 | Candillier ................ G01B 7/10 324/229 |
| 2017/0200515 | A1 | * | 7/2017 | Singh ..................... G21C 15/12 |

* cited by examiner

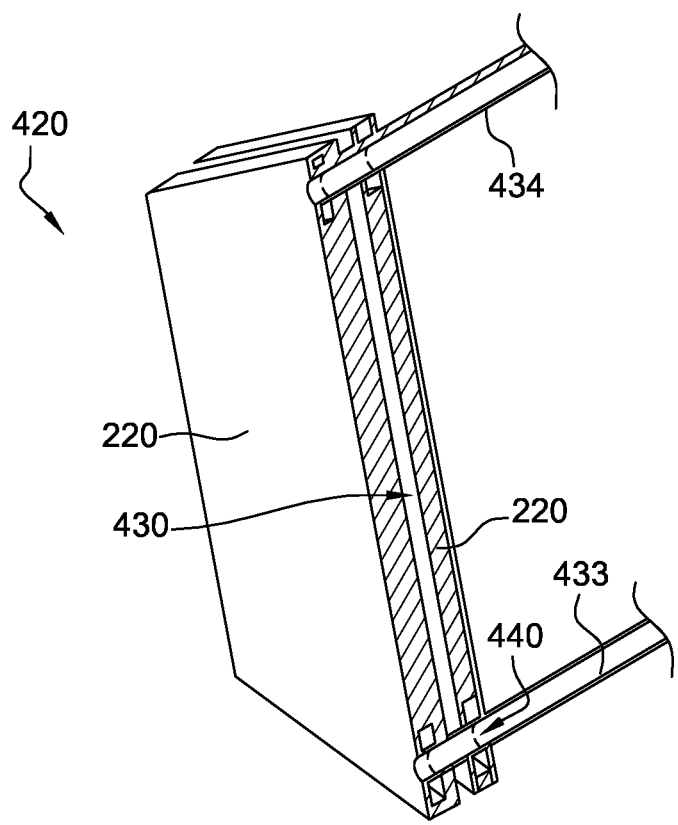
Fig. 6
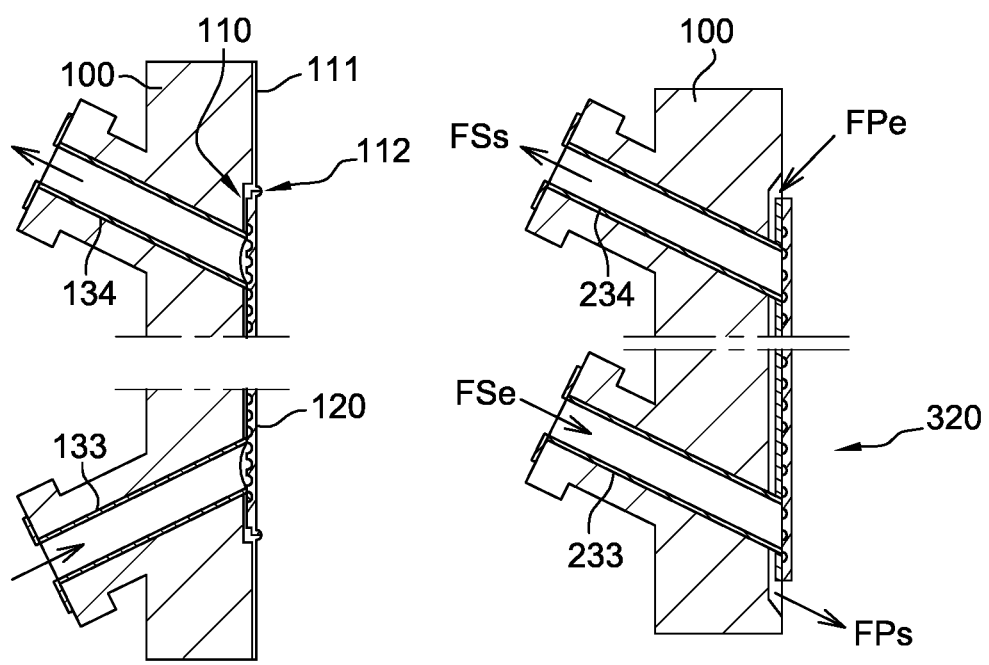
Fig. 7 Fig. 8

NUCLEAR REACTOR INTEGRATING A SAFETY PRIMARY HEAT EXCHANGER

CROSS REFERENCE TO RELATED APPLICATIONS

This application is the U.S. National Stage of PCT/EP2018/051875, filed Jan. 25, 2018, which in turn claims priority to French Patent Application No. 1750649 filed Jan. 26, 2017, the entire contents of all applications are incorporated herein by reference in their entireties.

TECHNICAL FIELD OF THE INVENTION

The invention relates to the field of nuclear reactors integrating safety primary heat exchangers, also called back-up primary heat exchangers, for cooling the reactor and evacuating the residual power from the core in the event of an incident.

The invention applies particularly but not only to integrated nuclear reactors and to SMRs (Small & Modular Reactors).

PRIOR ART

In integrated reactors and notably in SMRs, the power heat exchangers, also known as steam generators, as well as the safety heat exchangers are positioned in the vessel of the reactor. In this type of reactor, the increase in the number of primary heat exchangers inside the vessel of the reactor raises problems in terms of positioning or dimensioning of the vessel.

A first solution consists in providing the integration of safety primary heat exchangers in parallel with the power heat exchangers. In this configuration, the space available for the power primary heat exchangers, making it possible to cool the nuclear reactor during operation, is then drastically cut. One solution making it possible to maintain the efficiency of the cooling of the nuclear reactor consists in increasing the volume of the vessel of the reactor to integrate all of the different heat exchangers (power and safety), consequently causing over-dimensioning of the reactor.

Another existing solution consists in positioning the safety heat exchangers below or above the "stage" devoted to the optimal positioning of the heat exchangers in the vessel of the reactor. However, in this configuration, the positioning of the safety primary heat exchangers with respect to the core does not make it possible to optimise the natural circulation of the primary liquid and thus poses problems of efficiency of these safety heat exchangers positioned outside of the optimum cooling "stage". In such a configuration, it is thus necessary to over-dimension the safety exchangers or to increase the number thereof inside the vessel to guarantee the desired cooling of the reactor in the event of an incident.

However, none of the solutions described previously is entirely satisfactory.

DESCRIPTION OF THE INVENTION

In this context, the invention aims to propose a nuclear reactor comprising a safety primary heat exchanger making it possible to be integrated easily in the architecture of a vessel of an integrated nuclear reactor without increasing the volume of the vessel, and by proposing an architecture optimising the positioning of the safety primary heat exchangers so as to ensure the efficiency thereof.

To this end, the subject matter of the invention is a nuclear reactor comprising a vessel integrating at least one power primary heat exchanger for cooling the primary liquid of the nuclear reactor during normal operation of the reactor and at least one passive safety primary heat exchanger for cooling the primary liquid of the nuclear reactor in the event of a malfunction of the normal cooling of the primary liquid of the reactor, said nuclear reactor being characterised in that the vessel comprises a recess arranged in the thickness thereof and in that said passive safety primary heat exchanger is integrated at least partially in said recess.

The invention advantageously uses the "conventional" architecture of a vessel of a nuclear reactor by creating a recess in the thickness of the vessel and more specifically in the extra thicknesses of the vessel wall not useful from a dimensional viewpoint and which are imposed by the overall architecture of the reactor and by the manufacturing constraints, such as for example the thicknesses of the vessel wall at the level of the upper internal feed-throughs. In other words, the recess is arranged in an extra thickness of the existing vessel and which is not useful from a nuclear safety viewpoint. The invention thus differs from a vessel architecture that would have extra thicknesses initially provided during the design phase with a view to integrating such a primary side safety passive cooling system, and which would lead to an increase in the volume of the vessel and a significant increase in the manufacturing costs.

The nuclear reactor according to the invention may also have one or more of the characteristics below taken individually or according to all technically possible combinations thereof:
    said recess is arranged in the thickness of the vessel at the level of an extra thickness without dimensional interest or not meeting nuclear safety requirements.
    said recess arranged in the thickness of the vessel is positioned at a height corresponding to the positioning of said at least one power primary heat exchanger;
    said passive safety primary heat exchanger comprises a plurality of separators forming a network of exchange channels tor the circulation of the secondary cooling fluid between two adjacent separators;
    the separators of said plurality have a shape suitable for the control of the flow in the exchange channels formed by the separators;
    the separators of said plurality have a shape suitable for maintaining the spacing of the plates between each other or with respect to the bottom of the recess despite the background effect;
    the separators of said plurality have a suitable shape to withstand the stresses linked to the assembly process, such as diffusion welding;
    said passive safety primary heat exchanger is a cold plate having a first face in contact with the primary liquid and a second face in contact with a secondary cooling fluid, and said plurality of separators is positioned between the second face of the cold plate and the bottom of said recess;
    said passive safety primary heat exchanger comprises a casket (cassette) having a first plate and a second plate, said plates enclosing said plurality of separators forming an internal network for the circulation of the secondary cooling fluid;
    the vessel comprises feed-throughs emerging at the level of said recess and said passive safety primary heat exchanger comprises a feed tube positioned in the lower part of said passive safety primary heat exchanger and an extraction tube positioned in the upper part of said passive safety primary heat exchanger, the feed tube and the extraction tube enabling the circulation of the secondary cooling fluid inside said passive safety primary heat exchanger, the feed tube and the extraction tube passing through the vessel at the level of said feed-throughs;

the feed tube and the extraction tube communicate with said internal network for the circulation of the secondary cooling fluid;

said passive safety primary heat exchanger is formed by a plurality of caskets;

said recess has scoops and said passive safety primary heat exchanger comprises pads for maintaining said passive safety primary heat exchanger at a certain distance from the bottom of the recess, said scoops and said pads allowing a circulation of primary liquid in said recess;

said nuclear reactor is a small modular reactor.

BRIEF DESCRIPTION OF THE FIGURES

Other characteristics and advantages of the invention will become clear on reading the description that follows, with reference to the appended figures.

FIG. 6 illustrates, according to a longitudinal sectional view, a fourth embodiment of a safety heat exchanger according to the invention.

FIG. 7 illustrates, along a longitudinal section of the vessel, an example of integration of the safety primary heat exchanger illustrated in FIG. 2.

FIG. 8 illustrates, along a longitudinal section of the vessel, an example of integration of the safety primary heat exchanger illustrated in FIG. 5.

DETAILED DESCRIPTION OF AN EMBODIMENT

Figure 1:
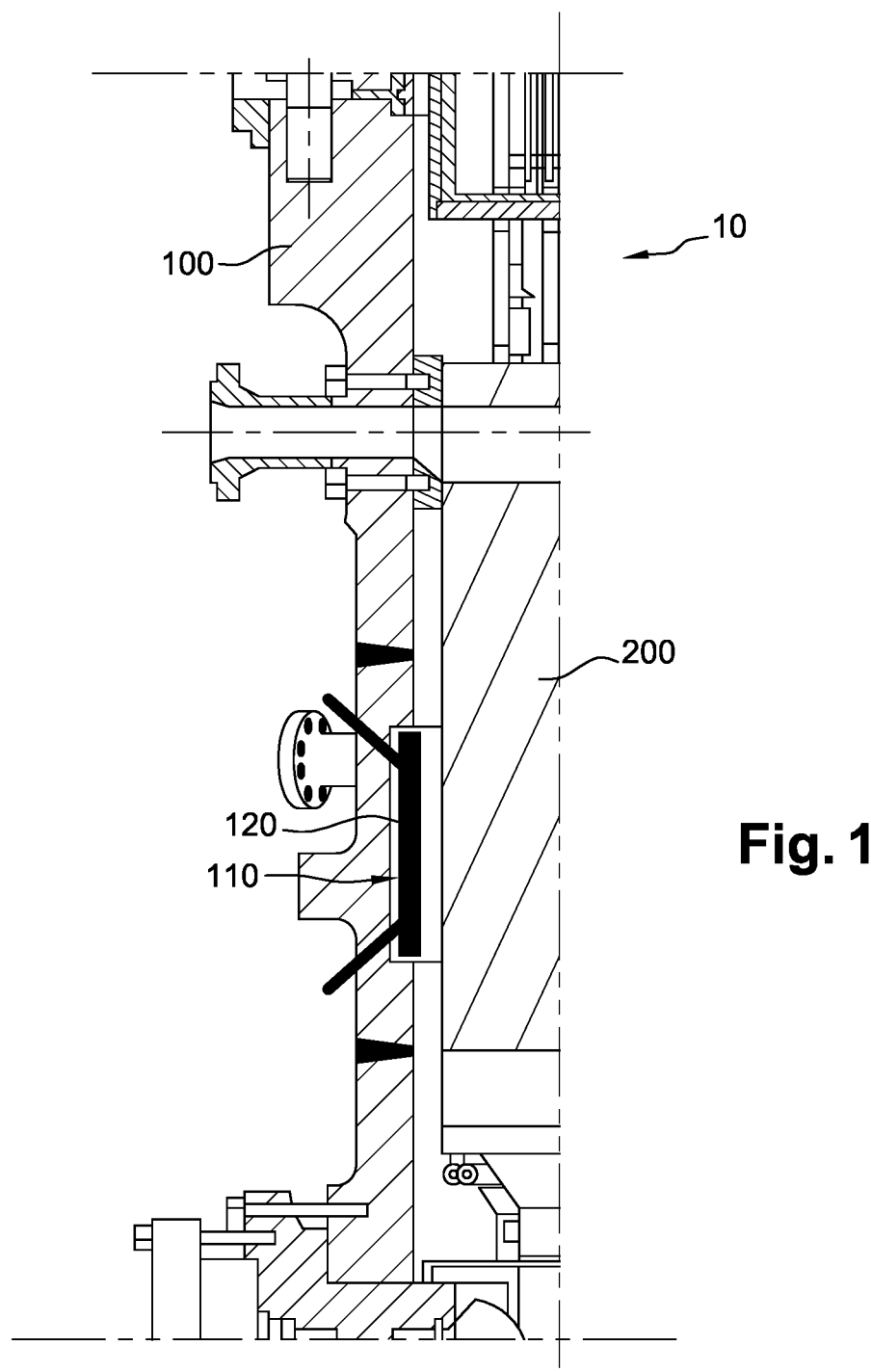
FIG. 1 illustrates a sectional view of a part of a vessel of an integrated nuclear reactor illustrating the region situated at the level of a power heat exchanger.

FIG. 1 is a sectional view of a part of a vessel 100 of an integrated type nuclear reactor 10 illustrating more specifically the periphery of the vessel 100 notably at the level of a power heat exchanger 200 positioned inside the vessel 100.

The vessel 100 of the integrated reactor has a recess 110 arranged in the thickness of the wall of the vessel 100 and positioned at a height, with respect to the core of the reactor, substantially equivalent to the positioning of a power heat exchanger 200. The recess 110 extends partially onto the perimeter of the vessel 100 thereby having a curvilinear shape and has a depth of the order of ten or so millimetres.

The recess 110, arranged in the vessel 100, makes it possible to position and to integrate at least partially a safety primary heat exchanger the thickness of the vessel 100 without encroaching on the inner volume dedicated to the positioning of the power heat exchanger 200 in the reactor and without perturbing or obstructing the circulation of primary fluid between the wall of the vessel and the power heat exchanger 200.

Figure 2:
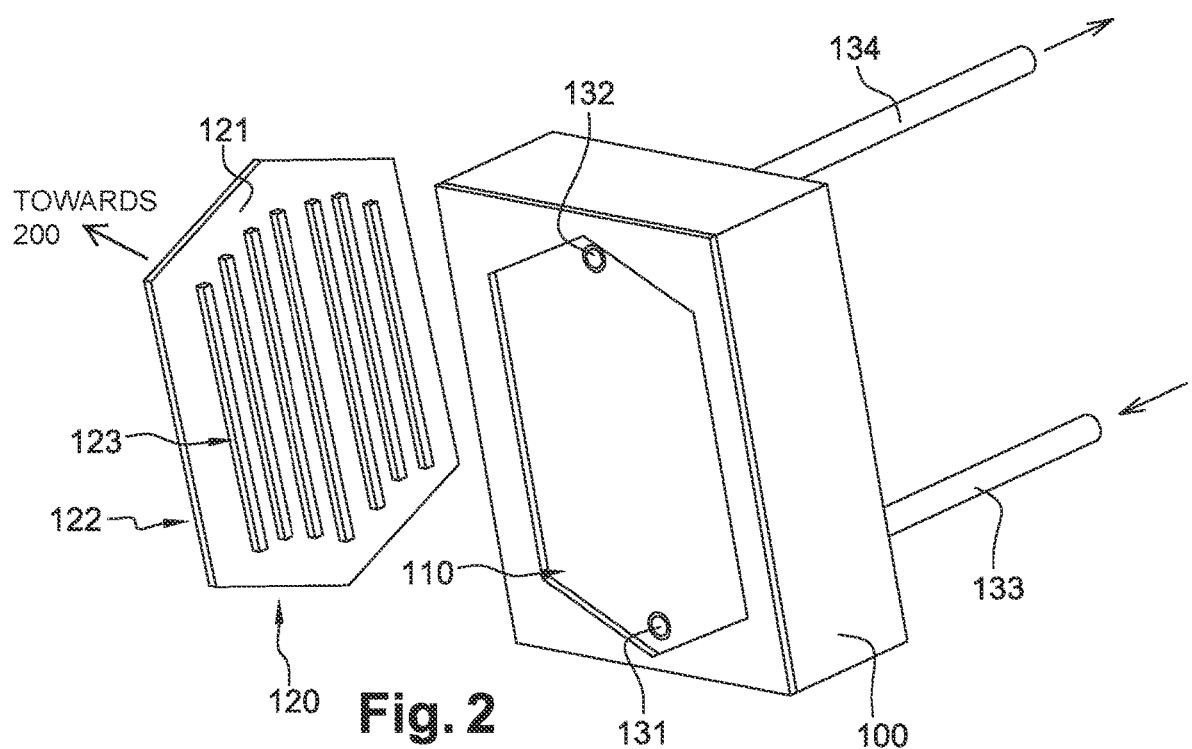
FIG. 2 illustrates in perspective a first embodiment of a safety heat exchanger according to the invention as well as a schematic representation of the region of the vessel illustrated in FIG. 1 provided to receive the safety exchanger according to the invention.

A first exemplary embodiment of a safety primary heat exchanger is schematically illustrated in FIG. 2. In this embodiment is also represented in perspective the region of the wall of the vessel 100 of the reactor having the recess 110 capable of receiving and integrating the safety primary heat exchanger according to the invention. According to this first exemplary embodiment, the safety primary heat exchanger is formed by a single cold wall 120 welded to the inner wall of the vessel 100 around the recess 110. The cold wall 120 comprises a first face 121 positioned towards the recess 110 side and a second face 122 facing the interior of the vessel 100, The first face 121 comprises separators 123 playing the role notably of spacers thereby making it possible to position, to guarantee the positioning of, the cold wall 120 in the recess 110 and at a certain predetermined distance from the bottom of the recess 110. The separators 123 are also useful for guaranteeing a good mechanical strength of the cold wall 120 under the effect of the primary pressure.

The separators 123 may have various shapes such as for example the longitudinal isthmus shape oriented in the direction of the height of the vessel as represented in FIG. 2. According to other embodiments, the separators 124 may be represented in various shapes such as for example cylindrical pads 124a, rectilinear shaped pads 124b or instead triangular shaped pads 124c as illustrated simultaneously in FIG. 4.

The separators 123, 124 thereby define in the recess 110 the exchange channels of a circulation network for the circulation of a cooling fluid, designated secondary or safety fluid, capable of carrying out a heat exchange with the primary fluid inside the vessel 100. The shape of the separators 123, 124 is determined as a function of the desired flow of the secondary cooling fluid in the circulation network, but also to ensure the maintaining of the spacing of the plates between each other or of the plate with respect to the bottom of the recess 110, despite the background effect, and to withstand the stresses linked to the assembly method (e.g. diffusion welding).

The isthmus-shaped separators 123, such as represented in FIG. 2, advantageously make it possible to create longitudinal channels in the direction of the height of the vessel favouring the vertical circulation (i.e. in the direction of the height of the vessel) of the secondary cooling fluid.

In this first embodiment illustrated in FIG. 2, the separators 123 are positioned on the cold wall 120, shown in the form of a plate, and more specifically on the face of the cold wall 120 facing the recess 110 of the vessel. According to an alternative embodiment, it is also provided to position the separators in the bottom of the recess 110.

The network thereby created is served by an admission 131 positioned in the lower part of the recess 110 and an evacuation 132 positioned in the upper part of the recess 110, the admission 131 and the evacuation 132 being respectively connected to feed-throughs passing through the wall of the vessel 100, called supply feed-through 133 for the supply in the lower part and evacuation feed-through 134 for the evacuation in the upper part. In this embodiment, the supply 133 and evacuation 134 feed-throughs are made integral and leak tight with the wall of the vessel by means conventionally used for this purpose. However, according to an alternative embodiment, the supply 133 and evacuation 134 feed-throughs may be replaced by simple ports passing through the vessel 100.

The separators 123 advantageously make it possible to create a particular flow and to force the flow rate of secondary fluid to cover all of the network of the cold wall 120 before coming out of the recess 110 through the evacuation feed-through 134 so as to maximise the heat exchange surface.

In a simplified manner, the cold wall 120 and the vessel wall 100 are represented as being flat. However, in practice, since the vessel wall 100 is cylindrical, the cold wall 120 has a cylindrical shape of which the curvature is substantially identical to the curvature of the bottom of the recess 110.

Advantageously, the production of a safety heat exchanger formed by a simple cold wall 120 makes it possible to use the flexibility of the cold wall 120 of low thickness to follow the curvature of the vessel 100, and more specifically the bottom of the recess 110, and to withstand the differential expansions inherent to the system.

FIG. 7 illustrates, along a longitudinal section of the vessel 100, an example of integration of the safety primary heat exchanger in the recess 110 of the vessel wall 100. A sealing between the cold wall 120 and the lining 111 of the inner wall of the vessel 100 is ensured for example by the production of a lip weld 112 of canopy type (circular or flattened). This type of welding advantageously makes it possible to limit deformations and stresses during the welding operation. FIG. 7 also illustrates the direction of circulation of the secondary cooling fluid between the supply feed-through 133 for the supply in the lower part and the evacuation feed-through 134 for the evacuation in the upper part.

Thus, thanks to the invention, the refrigeration of the primary liquid takes place mainly by the wall 122 of the cold wall 120 of the exchanger and, in a complementary manner, by conduction via the vessel wall, notably in the region close to the recess 110 that receives the secondary cooling fluid.

In this first embodiment, the recess 110 has a thickness of around 10 to 20 mm, which is sufficient to completely house the cold plate i.e. the cold wall 120 as illustrated in FIG. 7.

Figure 3:
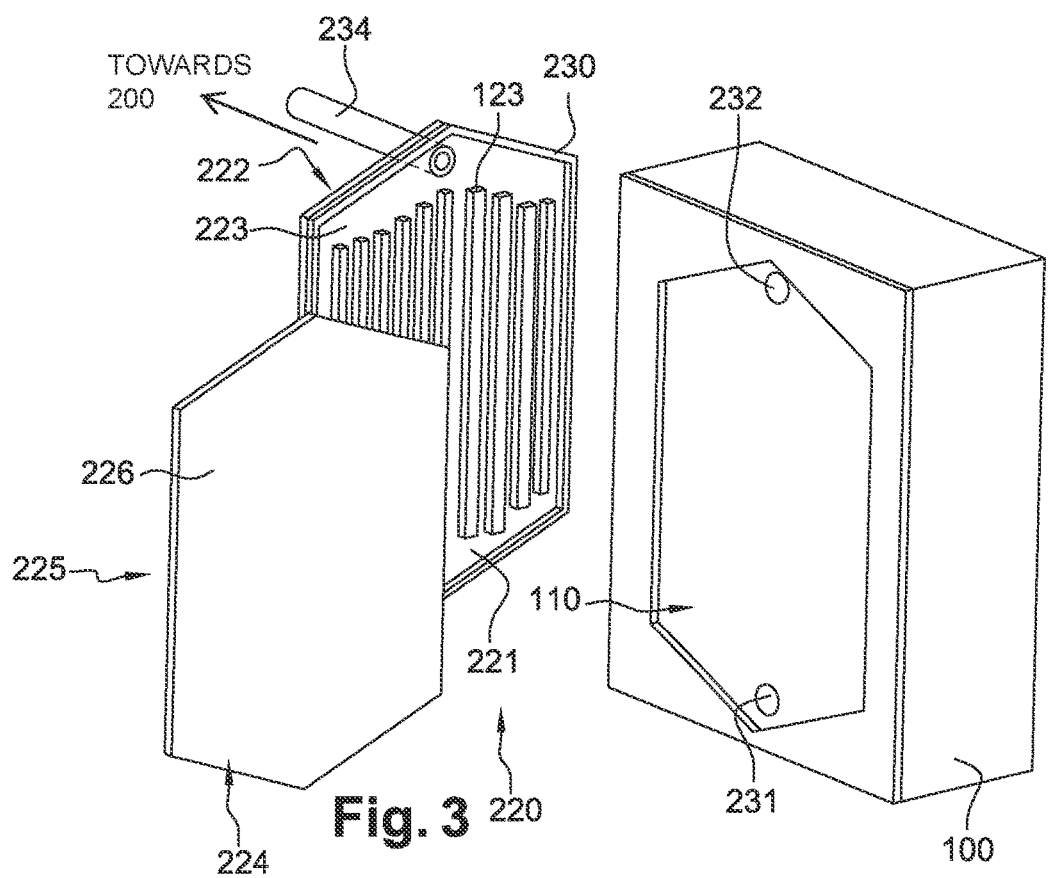
FIG. 3 illustrates in perspective a second embodiment of a safety heat exchanger according to the invention as well as a schematic representation of the region of the vessel illustrated in FIG. 1 provided to receive the safety exchanger according to the invention.

FIG. 3 illustrates a second embodiment of a safety primary heat exchanger 220. This second embodiment proposes a safety primary heat exchanger 220 that is demountable and has a self-supporting structure. To do so, the heat exchanger 220 is produced in the form of a demountable casket (called also "cassette"). This casket is constituted of two plates 221 and 224 positioned one on the other so as to form a compact and sealed assembly. The first plate 221 forms the bottom of the casket 220 and comprises an outer face 222 intended to be in contact with the bottom wall of the recess 110 and an inner face 223 comprising, in a manner identical to the first embodiment, a plurality of separators 123 forming a network of internal heat exchange channels for the circulation of the secondary fluid inside the sealed casket 220. The second plate 224 forms the outer wall of the casket 220 and has an inner face 225 positioned facing the inner face 223 of the bottom plate 221 and an outer face 226 directly in contact with the primary liquid and intended to be welded onto the inner lining of the vessel 100 when the casket 220 is in position in the recess 110.

Figure 4:
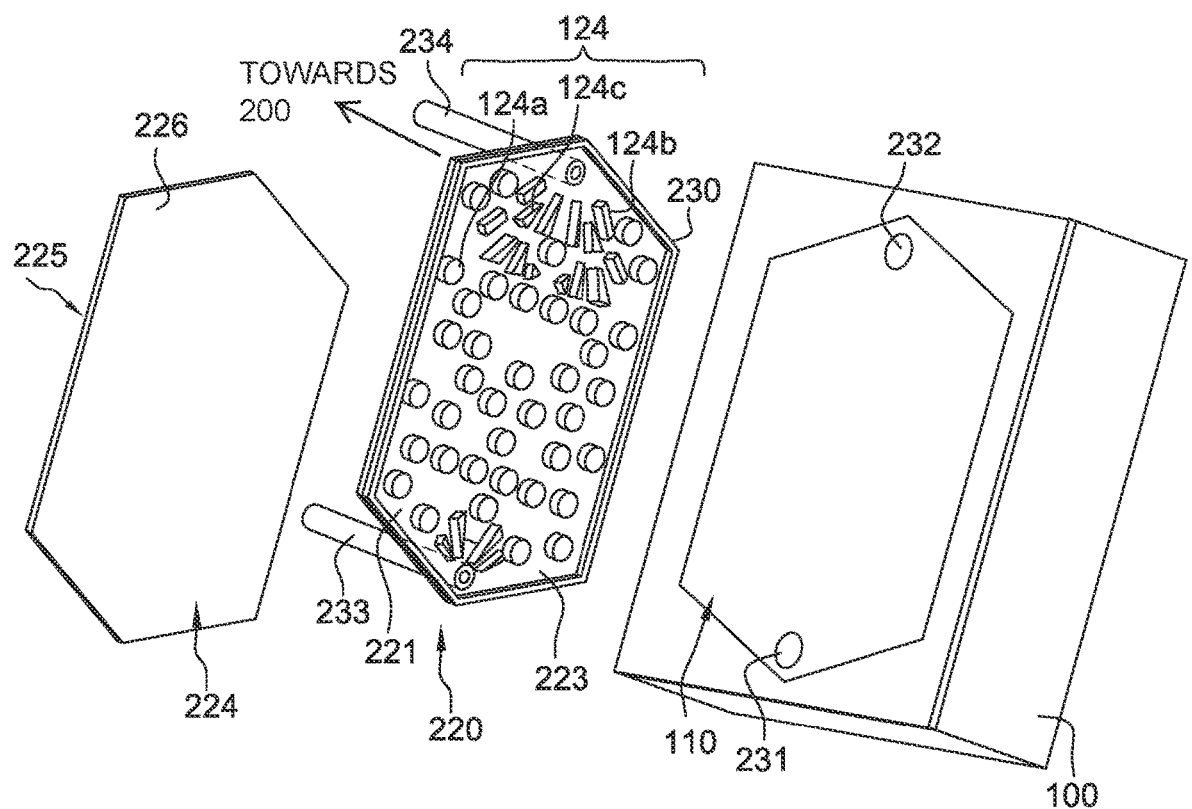
FIG. 4 illustrates in perspective an alternative embodiment of the second embodiment of a safety heat exchanger according to the invention illustrated in FIG. 3.

In an identical manner to the first embodiment described in FIG. 4, the separators 123 may have various shapes such as for example the longitudinal isthmus shape oriented in the direction of the height of the vessel as represented in FIG. 3, or instead in the form of pads that can have various shapes as illustrated in FIG. 4 which represents an alternative embodiment of the heat exchanger 220 produced in the form of a demountable "casket" illustrated in FIG. 3. The separators 124 may be for example of cylindrical shape 124a or rectilinear shape 124b or triangular shape 124c or instead a combination of several shapes. In this embodiment, the separators 123 may also ensure the maintaining of the spacing of the plates between each other.

In the second embodiment illustrated in FIG. 3 and in the alternative of this second embodiment illustrated in FIG. 4, the separators 123, 124 are positioned as an example on an inner face 223 of the first plate 221. According to an alternative embodiment, the separators 123, 124 may also be positioned on the inner face 225 of the second plate 224.

The two plates 221 and 224 are welded together at the level of their peripheral sidewalls so as to enclose inside the casket 220 the network of internal heat exchange channels thereby forming a closed secondary fluid circulation circuit. One of the two plates, for example the bottom plate 221 as represented in FIG. 3 and in FIG. 4, comprises a peripheral border 230, substantially of same thickness as the separators 123, 124, on which the outer plate 224 is supported.

The network of internal channels formed by the plurality of separators 123, 124 is connected to a feed tube 233 (not visible in FIG. 3) in the lower part of the casket 220 and to an extraction tube 234 in the upper part of the casket 220. The casket 220, equipped with these supply and extraction tubes 234, is placed in the recess 110 arranged in the wall of the vessel 100. The supply and extraction tubes are then positioned in the feed-throughs 231, 232 of the vessel 100.

The casket 220 is advantageously welded at the level of its outer plate 224 to the inner lining of the vessel wall 100, which makes it possible to do without an additional operation of welding the supply 233 and evacuation 234 tubes in the feed-throughs 231, 232, simplifying maintenance operations. Thus, the primary cooling fluid is stopped at the level of the link between the casket and the inner lining of the vessel wall 100. The secondary cooling fluid is for its part trapped in the casket. For this reason, it is not obligatory to resort to a welding operation from the outside of the feed tubes 233 and evacuation 234 tubes on the outer wall of the vessel 100 at the level of the penetrations to ensure the sealing of the assembly. Obviously, the carrying out of an additional welding from the outside of the supply and evacuation tubes makes it possible to obtain an additional sealing line with respect to the primary fluid (for example in the event of loss of sealing between the casket 220 and the vessel 100), or instead with respect to the secondary cooling fluid (for example in the event of leak from the casket in its part positioned in the vessel).

Figure 5:
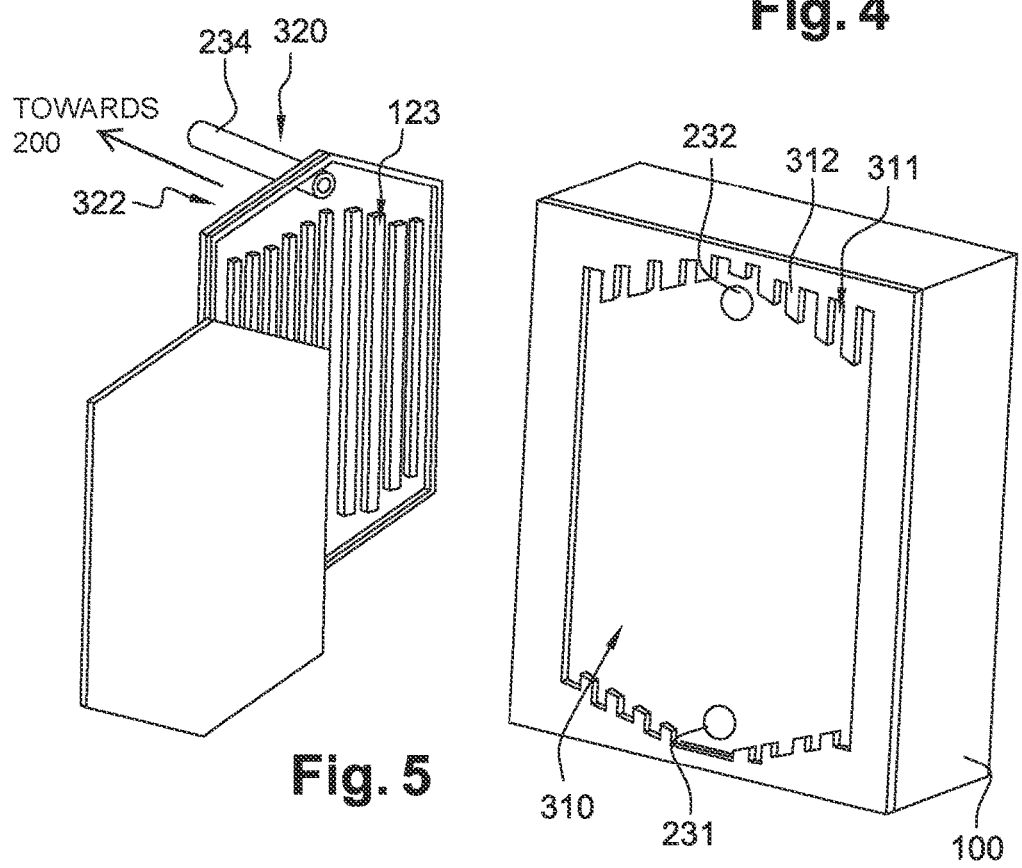
FIG. 5 illustrates in perspective a third embodiment of a safety heat exchanger according to the invention as well as a schematic representation of the region of the vessel illustrated in FIG. 1 provided to receive the safety exchanger according to the invention.

FIG. 5 illustrates a third embodiment of a safety primary heat exchanger 320 according to the invention. This third embodiment is substantially identical to the second embodiment described previously with the exception of the elements that will be described in the following paragraphs.

In this third embodiment, the safety primary heat exchanger 320 is not welded onto the inner lining of the vessel 100, so as to further facilitate its dismantling on the one hand and so as to maximise the cooling of the primary liquid on the other hand.

To do so, the safety primary heat exchanger 320, also in the form of a casket as illustrated previously, comprises on its bottom plate pads 312 positioned facing the bottom of the recess 310, the pads 312 making it possible to maintain the casket 320 at a certain distance from the bottom of the recess 310. The recess 310 also has grooves or scoops 311 allowing, in combination with the pads 312 of the casket 320, the introduction and the circulation of the primary liquid in the recess 310, that is to say behind the casket 320 when said casket is in position in the recess 310. The scoops 311 are advantageously placed in the longitudinal direction of the vessel 100 of the reactor so as to enable a natural circulation of the primary liquid from the top to the bottom of the reactor.

FIG. 8 illustrates, along a longitudinal section of the vessel 100, an example of integration of the safety primary heat exchanger 320 in the recess 310 of the vessel wall 100. The safety primary heat exchanger 320 is mounted projecting in the recess 310 of the vessel wall, at a certain distance from the bottom of the recess 310. The scoops 311 enable the passage of the primary fluid in the recess 310 along the direction of circulation represented in FIG. 8 by the arrows FPe and FPs. Thus, the primary fluid exchanges with the two walls of the exchanger 320.

FIG. 6 illustrates a fourth embodiment of a safety primary heat exchanger 420 according to the invention along a longitudinal section. This fourth embodiment is substantially identical to the second embodiment described previously with the exception of the elements that will be described in the following paragraphs.

Indeed, this fourth embodiment comprises a plurality of caskets 220, such as described with reference to FIG. 2, mounted in parallel and spaced apart from each other for an inner space 430 arranged to enable the introduction and the circulation of the primary fluid between the different caskets 220.

FIG. 6 illustrates only two caskets 220 mounted in parallel and spaced apart by an inner space 430. However, the safety primary heat exchanger 420 according to the invention may comprise a plurality of caskets 220 mounted in parallel, each casket of said plurality being spaced apart from a second adjacent casket by an inner space 430 in which primary liquid circulates. The number of caskets 220 of the safety exchanger will be chosen as a function of the desired ratio between bulk/performance.

In this embodiment, the supply 433 and extraction 434 tubes comprise openings 440 arranged at the level of each of the caskets of the exchanger, and more specifically at the level of the inner space of each of the caskets so as to enable the circulation of the secondary fluid inside the plurality of caskets 220.

According to an alternative of this fourth embodiment, the safety primary heat exchanger 420 may also comprise pads, such as described previously, in the third embodiment illustrate in FIG. 4.

Generally speaking, in all the embodiments described, the weldings are typically carried out by means of a diffusion welding method and the materials used to produce the safety exchangers described are conventionally materials of the stainless steel type or nickel based materials.

Generally speaking, the safety heat exchangers according to the invention as well as the vessel walls 100 have been schematically represented as being flat. However, in practice, given the vessel wall 100 is cylindrical, the safety exchangers described previously obviously have a curved, or cylindrical shape substantially identical to the curvature of the bottom of the recess 110 arranged in the wall of the vessel 100.

Thanks to the small bulk of the safety heat exchanger according to the invention, it is possible to integrate it directly in the thickness of the vessel wall of the nuclear reactor at a level, or stage, of the vessel making it possible to optimise the efficiency of such passive cooling systems. The positioning in a recess of the vessel thereby makes it possible to optimise the cooling of the primary liquid in the event of an incident without influencing or degrading the cooling capacities of the power heat exchangers of the reactor while in operation while meeting safety requirements at the level of the wall of the vessel of the nuclear reactor given the low thickness of the recess required for the integration of a safety heat exchanger according to the invention.

The invention claimed is:

1. A nuclear-reactor comprising a vessel comprising a wall and integrating at least one power primary heat exchanger for cooling a primary liquid of the nuclear reactor during normal operation of the reactor and
   at least one passive safety primary heat exchanger for cooling the primary liquid of the nuclear reactor in the event of a malfunction of the normal cooling of the primary liquid of the reactor,
   wherein the vessel comprises a recess arranged in the wall thereof and wherein said at least one passive safety primary heat exchanger is integrated at least partially in said recess,
   wherein said passive safety primary heat exchanger comprises a plurality of separators forming a network of exchange channels for circulation of a secondary cooling fluid between two adjacent separators.

2. The nuclear reactor according to claim 1, wherein said recess arranged in the wall of the vessel has a level of thickness for receipt of the at least one passive safety primary heat exchanger therein without obstructing circulation of the primary liquid between the wall of the vessel and the at least one passive safety primary heat exchanger.

3. The nuclear reactor according to claim 1, wherein said recess arranged in the wall of the vessel is positioned at a height corresponding to the positioning of said at least one power primary heat exchanger.

4. The nuclear reactor according to claim 1, wherein said passive safety primary heat exchanger is a cold plate having a first face in contact with the primary liquid and a second face in contact with the secondary cooling fluid and facing said recess, and wherein said plurality of separators is positioned between the second face of the cold plate and said recess.

5. The nuclear reactor according to claim 1, wherein said passive safety primary heat exchanger comprises a casket having a first plate and a second plate, said first and second plates enclosing said plurality of separators forming an internal network for the circulation of the secondary cooling fluid.

6. The nuclear reactor according to claim 5, wherein the vessel comprises feed-throughs emerging at the level of said recess and
   wherein said passive safety primary heat exchanger comprises a feed tube positioned in a first part of said passive safety primary heat exchanger and an extraction tube positioned in a second part of said passive safety primary heat exchanger, the feed tube being positioned relatively below said extraction tube in a longitudinal direction of the vessel,
   the feed tube and the extraction tube enabling the circulation of the secondary cooling fluid inside said passive safety primary heat exchanger, the feed tube and the extraction tube passing through the vessel at the level of said feed-throughs.

7. The nuclear reactor according to claim 6, wherein the feed tube and the extraction tube communicate with said internal network for the circulation of the secondary cooling fluid.

8. The nuclear reactor according to claim 5, wherein said passive safety primary heat exchanger is formed by a plurality of caskets.

9. The nuclear reactor according to claim 5, wherein said recess has grooves and wherein said passive safety primary heat exchanger comprises pads to maintain said passive safety primary heat exchanger at a certain distance from the bottom of the recess, said grooves and said pads allowing a circulation of primary liquid in said recess.

\* \* \* \* \*